United States Patent
Rowley et al.

(10) Patent No.: US 9,440,395 B1
(45) Date of Patent: Sep. 13, 2016

(54) RESHAPING TOOL FOR POLYMERIC TUBING

(75) Inventors: William Rowley, Chagrin Falls, OH (US); William Blue, Middlefield, OH (US); Thomas K'Meyer, Ravenna, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 1194 days.

(21) Appl. No.: 13/412,003

(22) Filed: Mar. 5, 2012

Related U.S. Application Data

(63) Continuation-in-part of application No. 12/618,089, filed on Nov. 13, 2009, now Pat. No. 8,147,236.

(51) Int. Cl.
  *B29C 57/04* (2006.01)
  *B29C 57/02* (2006.01)
  *B29C 65/00* (2006.01)
  *B29C 61/02* (2006.01)

(52) U.S. Cl.
  CPC .............. *B29C 57/04* (2013.01); *B29C 57/02* (2013.01); *B29C 66/8322* (2013.01); *B29C 61/025* (2013.01); *B29C 66/534* (2013.01)

(58) Field of Classification Search
  CPC ............ B29C 61/025; B29C 33/0033; B29C 66/534; B29C 66/8322; B29C 57/02; B29C 57/00; B29C 57/04; B29C 65/56; B29C 65/64; B29C 65/565
  USPC ................ 264/230, 299, 249, 320, 322, 323
  See application file for complete search history.

(56) References Cited

U.S. PATENT DOCUMENTS

| | | | |
|---|---|---|---|
| 2,461,337 A * | 2/1949 | Miskimen | 285/286.1 |
| 2,963,068 A | 12/1960 | Chiappe | |
| 4,157,372 A | 6/1979 | Kyomen | |
| 4,403,938 A | 9/1983 | Seach et al. | |
| 4,545,951 A | 10/1985 | Gordon | |
| 5,445,508 A * | 8/1995 | Kubo et al. | 425/28.1 |
| 5,861,200 A * | 1/1999 | Rowley | 428/36.9 |
| 6,224,812 B1 * | 5/2001 | Allan et al. | 264/328.1 |
| 6,272,762 B1 | 8/2001 | Kinast et al. | |
| 6,417,758 B1 | 7/2002 | Russell et al. | |
| 6,761,574 B1 | 7/2004 | Song et al. | |
| 6,789,398 B1 | 9/2004 | Daoud et al. | |
| 6,993,953 B2 | 2/2006 | Stupecky | |
| 7,007,391 B2 * | 3/2006 | Stoick et al. | 30/101 |
| 7,010,953 B2 | 3/2006 | Stupecky | |
| 7,927,534 B1 | 4/2011 | Seman, Sr. et al. | |
| 2011/0293356 A1 * | 12/2011 | Billings | 403/2 |

OTHER PUBLICATIONS

U.S. Appl. No. 12/618,158, filed Nov. 13, 2009.
U.S. Appl. No. 12/618,226, filed Nov. 13, 2009.
U.S. Appl. No. 12/618,296, filed Nov. 13, 2009.

* cited by examiner

*Primary Examiner* — Yogenda Gupta
*Assistant Examiner* — Ninh Le
(74) *Attorney, Agent, or Firm* — Hahn Loeser & Parks, LLP

(57) ABSTRACT

A method for reshaping a tube end using a reshaping tool incorporating a tool head and clamp for reshaping the cross section of a tube constructed from one or more polymer materials. The clamp holds the tube in place while the head portion of the tool, which is moveable with respect to the clamp, engages the tube for reshaping its profile cross section. The tube may be crosslinked polyethylene tube.

20 Claims, 4 Drawing Sheets

RESHAPING TOOL FOR POLYMERIC TUBING

This application claims priority to U.S. patent application Ser. No. 12/618,089 filed on Nov. 13, 2009, now U.S. Pat. No. 8,147,236, the disclosure of which is incorporated by reference.

TECHNICAL FIELD

The present invention pertains generally to tools for reshaping polymeric tubing, and more specifically, to tools that reshape the inner and outer diameter of polymeric tubing.

BACKGROUND OF THE INVENTION

Long lengths of polymeric tubing, as manufactured via an extrusion process, are typically stored in bundles and preferably wound onto a reel or spool. A spool makes it convenient to transport and/or store large quantities of tubing. In some cases, the spool extends up to five (5) feet or more in diameter, and can hold hundreds or even thousands of pounds of tubing. Tubing which is wound onto a spool also enhances and facilitates distribution, as any desired line of tubing may simply be metered from the spool and cut to length for sale or use by an end user.

Polymeric tubing is used in a wide variety of applications. The inherent flexibility of polymers make it easy for tubing to be assembled into complex and circuitous configurations. Additionally, plastic tubing is well suited for use in pressurized or non-pressurized systems. The strength of polymeric tubing can be further enhanced by crosslinking, making the tubing even more durable and resistant to deterioration from a wide variety of substances.

In a manner well known in the art, fittings may be inserted into or onto ends of the tubing for establishing a fluid tight connection between components in a system. In some cases, fittings insert over the exterior of the tubing, the tubing having an outer diameter or outside dimension ("O.D."), while in other cases, fittings are inserted into the inside of the tube, the tube having an interior diameter or interior dimension ("I.D.") of the tubing. In all instances, a fluid tight connection is needed to prevent leaks. O-rings, compression rings and other such articles are used to further ensure that the juncture between the fitting and the polymeric tubing remains secure and leak-proof.

As tubing is wound onto a spool, weight from the bundle compresses the tubing. The magnitude of distortion varies from several factors including position of the tubing on the spool, as well as the size of the spool, the quantity of tubing stored on the spool and the degree of tightness associated with the wrapping of the tubing about the spool. Distortion may also be a function of the wall thickness of the tubing as well as being dependent upon polymer composition, nature and degree of fillers, antioxidant package, crosslinking percentage, etc. When unwound, it was discovered that the initially formed circular tubing has been reshaped into an oval or elliptical configuration. Attempts to connect a fitting, valve or other component to a distorted or deformed end section of tubing frequently resulted in a leak at the interface between the components. This is particularly problematic with push-to-connect fittings.

Accordingly, end users attempt to reform or reshape the tubing. In some instances, the exterior of the tubing is the critical surface that needs reshaped, as is the case with an O.D. fitting. The interior of the tubing may similarly need reformed to seal against an internally received fitting. Pliers are one type of make-shift tooling used in the field to reshape the tubing. Leverage from the handles supply force to the exterior tubing walls. However, force from the make-shift tooling is not uniform about the circumference of the tubing, and as a result the tubing is often simply reshaped into a different elliptical configuration.

What is needed is a tool that reshapes polymer tubing evenly into a symmetrical configuration with respect to both its inner and outer diameter. A primary purpose of this invention is to provide such an arrangement with its various attendant advantages.

SUMMARY OF THE INVENTION

According to one aspect of the invention, there is provided both an apparatus and process for effecting a transformation from a non-uniform cross-sectional diametered tubing to a more uniform cross-sectional diameter. The reshaping tool for this transformation incorporates a tool head and clamp for reshaping the cross section of a tube constructed from one or more polymer materials. A clamp holds the tube in place while the tool head, which is moveable with respect to the clamp, engages the tube for reshaping its cross section. The tool head may comprise a tapered aperture and tapered head that function to shape the outer diameter and inner diameter of the tube respectively.

In one embodiment of the invention, a method of reshaping an end of a tube includes clamping a deformed tube in a tubing clamping means with an end of the tube axially aligned with a reshaping tool, axially engaging the reshaping tool against the tube end, and reshaping the end of the tube in conformity with the shape of the reshaping tool by axially forced contact of the reshaping tool against the tube end, without adding heat to the reshaping tool. The reshaping tool may reshape an interior surface or an outside surface of the tube.

In one alternative, a polymer tube is reshaped after having been crosslinked setting a permanent dimension of the tube and shape memory characteristics, where the reshaped end of the tube has at least one reshaped dimension larger than or less than the permanent dimension. When the tube is crosslinked prior to reshaping, the present method may further include assembling the end of the tube with a mating part, and applying an external or internal stimulus to the tube end engaging the tube end to an interior surface or an outside surface of the mating part by shape memory.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

The best mode for carrying out the invention will now be described for the purposes of illustrating the best mode known to the applicant at the time. The examples are illustrative only and not meant to limit the invention, as measured by the scope and spirit of the claims. The embodiments selected for description have been chosen to enable one skilled in the art to practice the invention. Although the disclosure is described primarily in connection with liquids, it should be understood that additional types of fluids (including gases) may be used.

Figure 1:
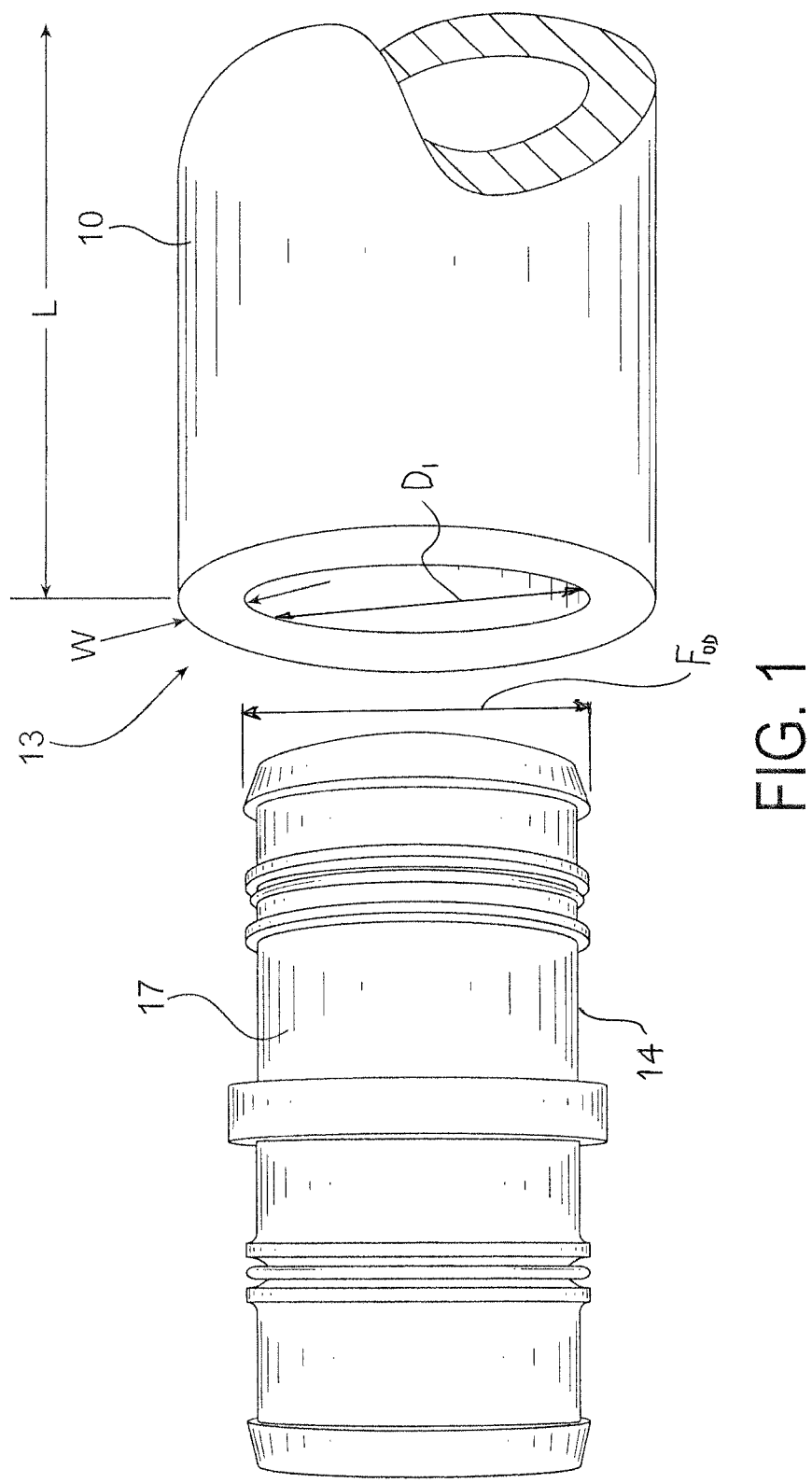
FIG. 1 is a perspective view of a partial length of polymeric tubing, a portion of which is illustrated in partial cut-away cross-section adjacent an associated I.D. (Inner Diameter or Interior Dimension) fitting.

Referring now to the drawings wherein the showings are for purposes of illustrating embodiments of the invention only and not for purposes of limiting the same, FIG. 1 shows one end of a section of tubing 10 for conveying fluid through a system, not shown in the Figures. Tube 10 may be of any chosen length suitable for use with the system and having a tubing wall thickness W dimensioned appropriately depending on the requirements of the system, i.e., pressurized or non-pressurized. Fitting 17 may be received in at least one end 13 of tube 10 and connected in a fluid tight manner to prevent the leakage of the fluid. Tubing 10 may be formed in various ways, e.g., by extrusion. As such tubing 10 may be constructed from any extrudable polymeric material, including but not limited to: PVC (polyvinyl chloride); PE (polyethylene); or PP (polypropylene). As noted above, as tubing is wound onto a spool, the combination of the inherent weight of the tubing, coupled with the degree of tightness of the wound tubing, compresses the cross-sectional profile of the tubing from an initial essentially circular cross-sectional diameter to a deformed cross-sectional diameter, which is more oval. It is recognized that any departure from circular cross-section imparts the possibility of leaks into the connection between the O.D. of fitting 17 and the I.D. of tubing 10.

Figure 1A:
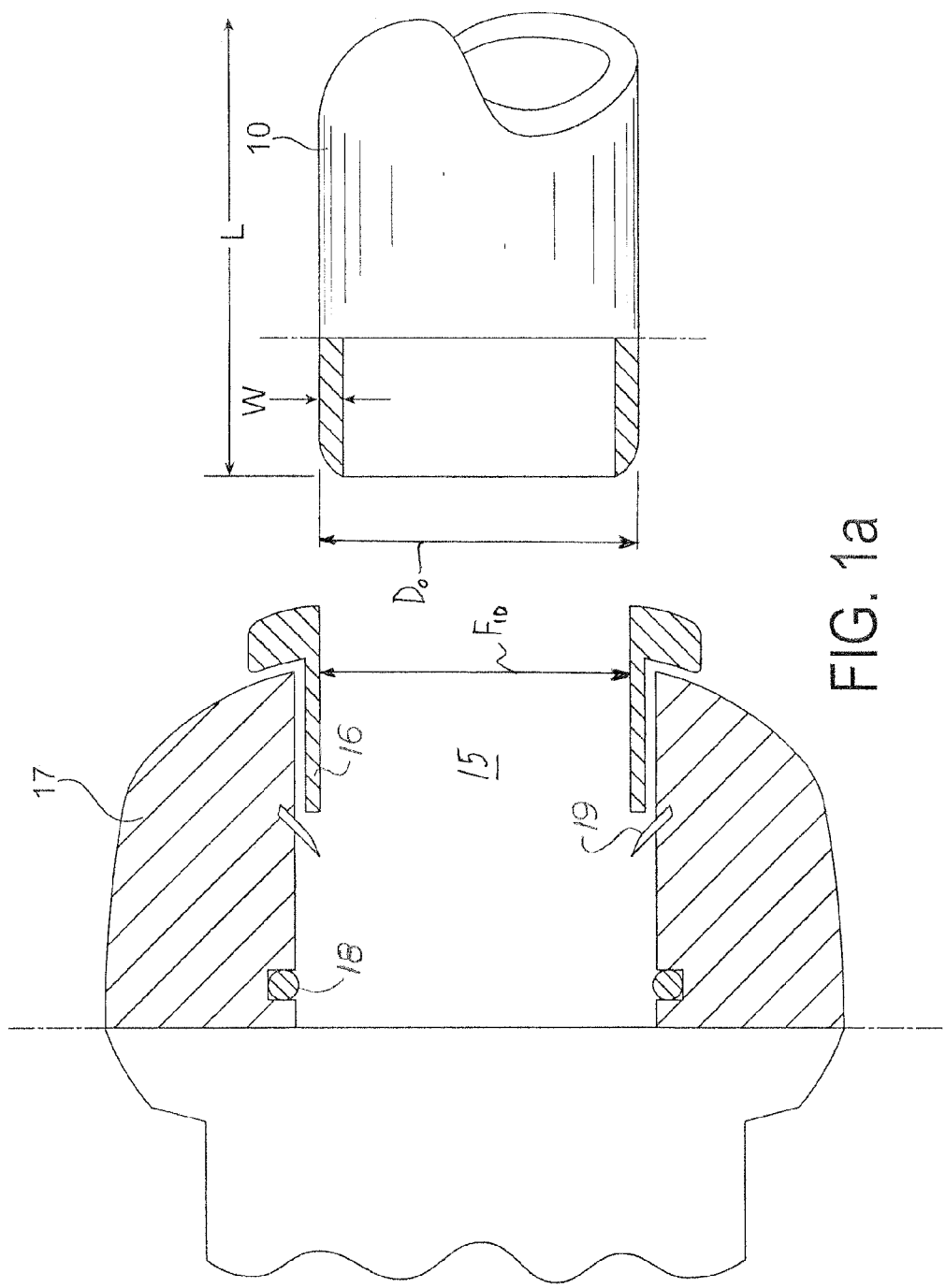
FIG. 1a is a side elevational view in partial cutaway of a partial length of polymeric tubing adjacent an O.D. (Outer Diameter or Outside Dimension) fitting.

While the insertion of fittings such as that illustrated in FIG. 1 are tolerant of non-circular cross-sectional diameters, in that typically hose clamps or other externally affixed crimp rings are applied, which physically correct any non-spheroid imperfection, that is not possible with newer unidirectional "push-to-connect" fittings, as illustrated in FIG. 1a. Any non-uniformity of the diameter in a push-to-connect fitting will result in leaks due to the imperfect physical connection between inserted tubing 10 and O-ring 18 in the fitting, thereby resulting in a source of leaks to the end-user or consumer, which leads to potential liability of either the installer or manufacturer or both. There is no ability to correct the leak in that grippers or retainer blades 19 positioned inward of collet 16 permit movement only in an insertion direction, and once installed, cannot be removed without destroying the fitting.

Figure 2:
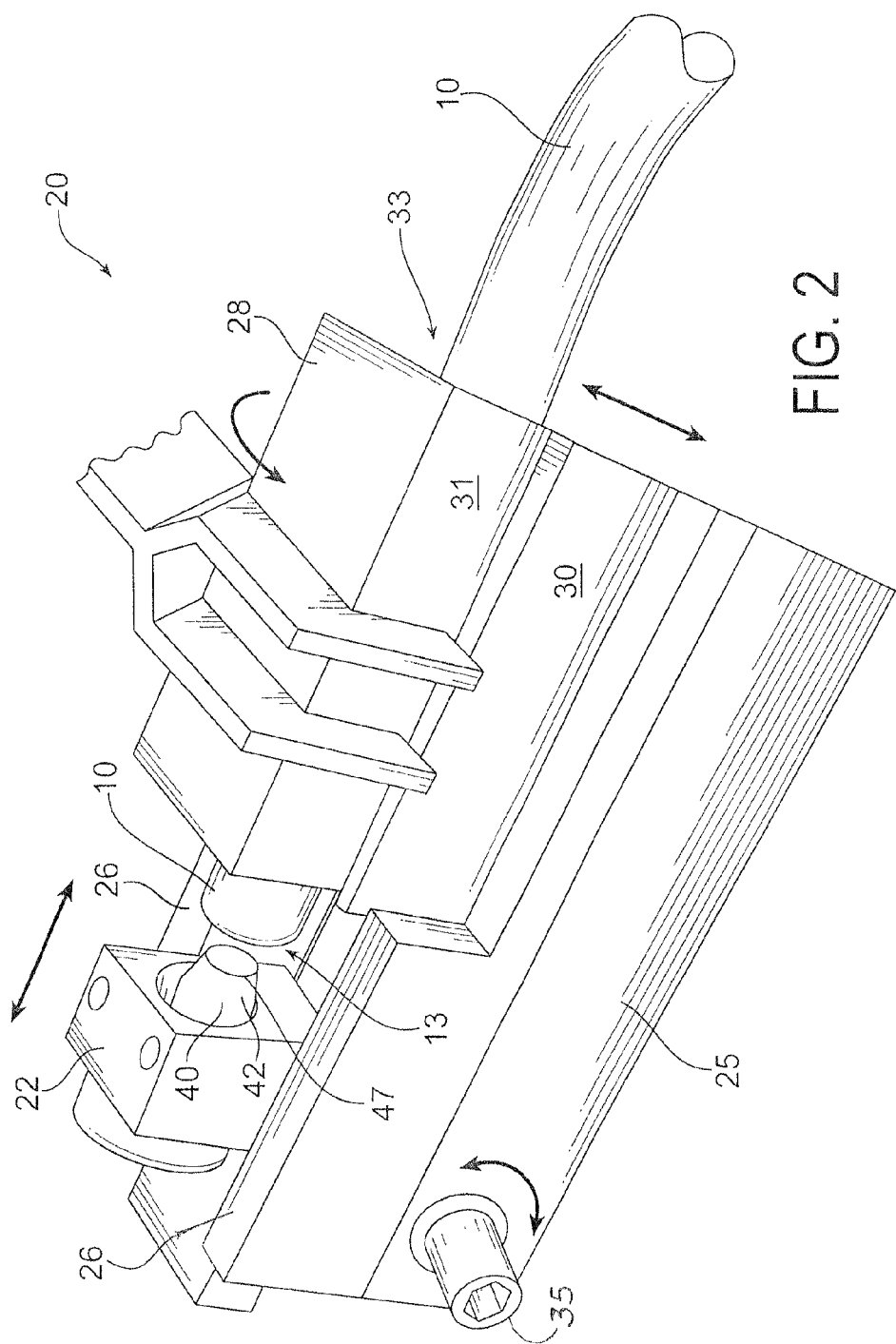
FIG. 2 is a perspective view of a tool for reshaping tubing.

FIG. 2 depicts a tubing cross-sectional profile reshaper 20, that is operable to change the cross-sectional profile shape of tube 10. In particular, reshaper 20 is operable to alter the cross-section of tubing 10 (i.e., render the diameter more uniform) making it suitable for connecting with another component, like for example fitting 17, in a fluid-tight and leak-proof manner. More specifically, reshaper 20 is constructed to reshape a generally non-uniform cross-sectional diameter of tubing 10, which may be oval, into an essentially spherical shape. While the Figures show a particular cross-sectional shape of tube, namely rounded tube, it is noted that reshaper 20 may be configured and utilized to reform any cross-sectional configuration from a deformed condition, back into its original profile. In this manner, reshaper 20 functions to reshape deformed sections of tubing 10 for subsequent connection to one or more associated components.

Reshaper 20 may include a head portion 22 and clamping means 28 that work in concert to reshape the cross-section of tubing 10. In one embodiment, head portion 22 and clamping means 28 may be connected at distal ends of a rigid frame or base 25. Base 25 may further include one or more sets of generally parallel longitudinal rails 26 configured to receive head portion 22 in a moveable manner. In one manner of movement, head portion 22 may slide along the length of the rails 26 for engaging tubing 10 as will be discussed further in a subsequent paragraph. It is noted that rails 26, while allowing longitudinal axial movement back and forth, prevent head portion 22 from moving laterally thus maintaining alignment of head portion 22 with respect to clamping means 28. By way of the contrast, a portion of clamping means 28 may be fixedly attached to base 25, that is to say with respect to movement in the axial direction, and may be configured for firmly gripping tube 10 by rotational movement (although other means of engagement are within the scope of this invention), thereby allowing it to be reshaped while in contact with head portion 22. It is noted that a preferred embodiment illustrates head portion 22 that moves with respect to an axially fixed clamping means 28. However, it is to be construed that any manner of relative movement between head portion 22 and clamping means 28 may be chosen that is effective for reshaping the cross section of tube 10.

With continued reference to FIG. 2, clamping means 28 may include first and second clamping portions 30, 31. In one embodiment, first clamping portion 30 may be secured from axial movement with respect to base 25, as mentioned above. Although, it is recognized that first clamping portion 30 may be adjustable vertically and/or laterally or horizontally for aligning differently sized tubing 10 with head portion 22. Second clamping portion 31 may be pivotally connected with respect to first clamping portion 30. In this manner, clamping means 28 may be opened for inserting or removing tubing 10 and closed for firmly gripping tubing 10 during operation.

Clamping means 28 is fashioned to have channel 33 for receiving tubing 10. Channel 33 may be configured to receive, and more specifically to clamp onto, a variety of different diametered tubing. In various embodiments, the cross-section of channel 33 may be V-shaped or alternatively U-shaped or alternatively circular. Although, any configuration of channel 33 may be incorporated as is appropriate for use with the embodiments of the present invention. In one particular embodiment, first clamping portion 30 is similarly configured, or substantially identical, to second clamping portion 31. For example, the V-shaped or U-shaped or circular grooves may be cut into each face of first and second clamping portions 30, 31. Still, any configuration of channel 33 as formed in either of the first and second clamping portions 30, 31, may be chosen with sound engineering judgment. When the grooves are circular, it is preferred that the I.D. of the channel be slightly smaller than the O.D. of the tubing so as to minimize longitudinal axial movement of the tubing.

As illustrated above and in a preferred embodiment, clamping means includes an upper portion, a lower portion, the upper portion in rotational engagement with the lower portion in the preferred embodiment, recognizing that other modes of operational engagement are within the scope of the invention; the channel having a cross-sectional profile which is selected from the group consisting of "U"-shaped, "V"-shaped and "O"-shaped, and wherein when the upper and lower portions are in a closed position, the tubing is at least partially inwardly compressed when positioned within the channel for securing engagement therein thereby minimizing longitudinal axial movement therein. The inward compression may be accomplished by an inwardly projecting member within the channel or by the channel having a cross-sectional diameter which is smaller than the cross-sectional diameter of the tubing.

Figure 3:
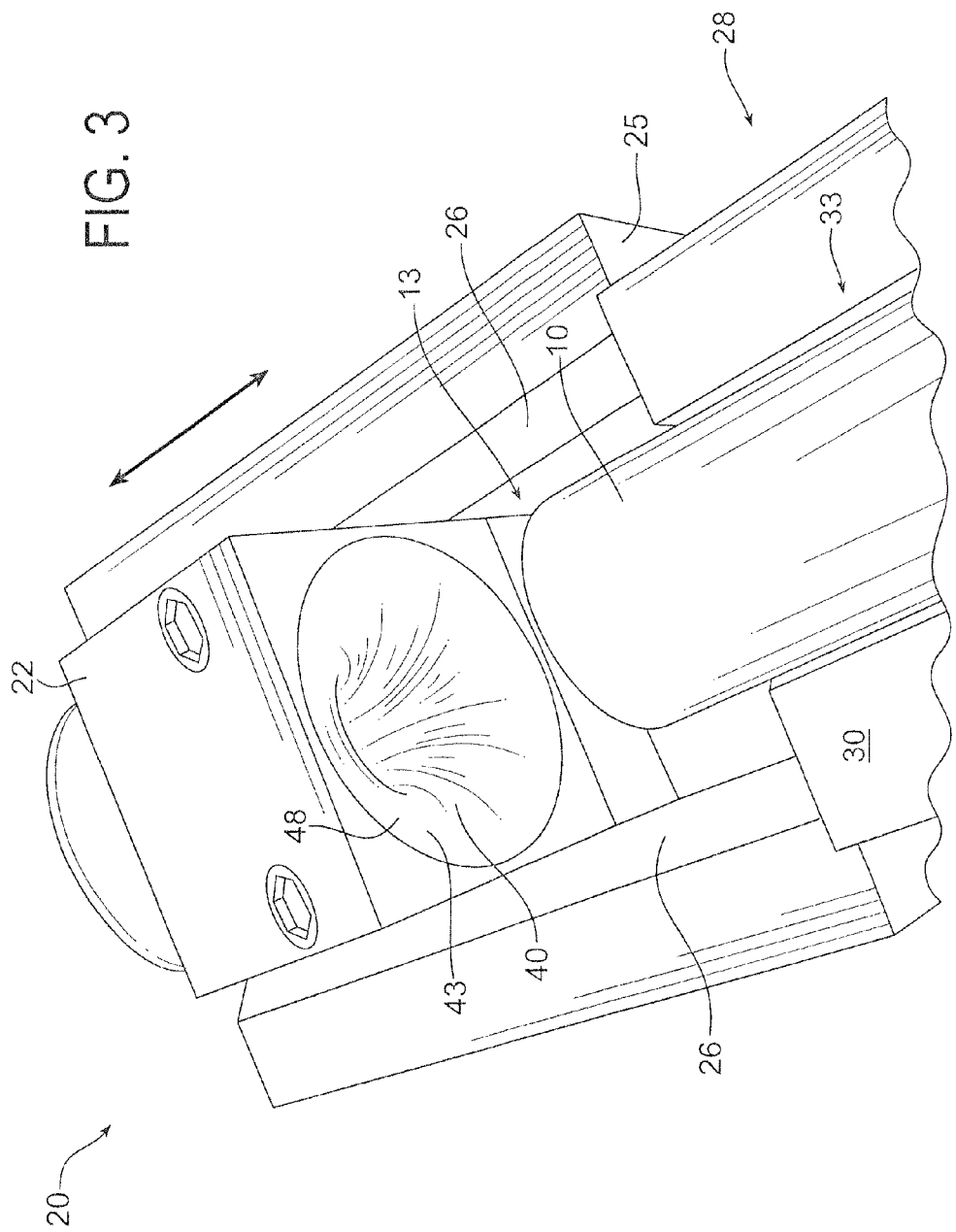
FIG. 3 is an enlarged perspective view of a tool for reshaping tubing.

Referring now to FIGS. 2 and 3, head portion 22 may incorporate one or more reshaping tools 40. The one or more reshaping tools 40 may function to shape different portions of tube 10. In one embodiment, a first shaping tool 42 reshapes the I.D. of tubing 10. Conversely, a second reshaping tool 43 (illustrated in FIG. 3) may function to reshape the O.D. of tubing 10. The quantity of reshaping tools, as described, is not to be construed as limiting. Rather, any number of reshaping tools 40 may be implemented without departing from the intended scope of coverage of the embodiments of the subject invention. Additionally, in one embodiment, the temperature of one or all of reshaping tools 40 and/or 43 may be elevated above room temperature, the degree of increase being dependent upon the wall thickness of the tubing, the type of amount of fillers within the tubing walls, the degree of crosslinking associated with the tubing, the polymeric composition of the tubing, etc. In one embodiment, electric current may be induced within that portion of reshaping tool 40 that contacts tubing 10. Alternatively, heated air or a heated circulating fluid may be utilized to raise the temperature of reshaping tool 40. Although, any means may be employed to heat the reshaping tools 40 as is appropriate for use with the embodiments of the present invention.

The first reshaping tool 42 may be configured to incorporate a tapered head 47 extending from a first maximum diameter to a second minimum diameter. Of course, it will be realized by persons of ordinary skill in the art that the maximum and minimum diameters of the first reshaping tool 42 define the range of tube inner diameters for which reshaper 20 may be used. In a manner consistent with that described above, tapered head 47 may slide into engagement with tubing 10, as securely gripped by clamping means 28, contacting the I.D. of tubing 10. Force applied to head portion 22 may therefore reshape the I.D. of tubing 10 in conformity with the external peripheral surface shape of first reshaping tool 42.

Similarly as illustrated in FIG. 3, second reshaping tool 43 may incorporate a tapered aperture 48, again extending from a first maximum diameter to a second minimum diameter in either a linear or non-linear fashion. It follows that the maximum and minimum diameters of second reshaping tool 43 define the range of tube outer diameters for which reshaper 20 may be used. Accordingly, by forcing contact of head portion 22 into engagement with tubing 10, its outer diameter will conform to the shape of the second reshaping tool 43.

Head portion 22 may be actuated to apply force used to reshape tubing 10 by manual and/or mechanized means. In one embodiment, an operator may apply force to the head portion 22 by physically moving the tool head portion 22 into engagement with tubing 10 as needed to sufficiently reshape its cross-sectional profile. Leverage (e.g., knob 35) may be used to amplify the magnitude of force applied through head portion 22 in any manner chosen with sound judgment. Alternatively, head portion 22 may be actuated by motors or machines as energized from a power source. Still, any manner of applying force to head portion 22 for reshaping tubing 10 may be utilized as is appropriate for use with the embodiments of the present invention.

Referring to all of the Figures, the operation of the reshaper 20 will now be described. An operator may clamp a section of polymeric tubing into clamping means 28 adjusting the position of the tubing so that the center aligns with reshaping tools 40. Once secured to the reshaper 20, head portion 22 may be arranged so that one or both of reshaping tools 40 reshape the cross section of the tubing. Subsequently, the operator engages the tool head in one or more cycles applying force to reshape the tubing into a generally symmetrical pattern in a preferred embodiment.

Stated another way, the operation of the reshaper 20 may include the operator clamping a deformed tube in the tubing clamping means 28 with an end of the tube axially aligned with the reshaping tool 40, and axially engaging the reshaping tool against the tube end. Then, the method may include reshaping the end of the tube in conformity with the shape of the reshaping tool by axially forced contact of the reshaping tool against the tube end, without adding heat to the reshaping tool. After reshaping the tube, a fitting may be applied to the end of the tube. The method of reshaping the tube end may reshape the I.D. of the tubing by forming an inside or interior surface of the tube adjacent the tube end in conformity with the shape of the reshaping tool. Alternatively, the method of reshaping the tube end may reshape the O.D. of the tubing by forming an outside surface of the tube adjacent the tube end in conformity with the shape of the reshaping tool.

As discussed above, the reshaping tool may be actuated to apply force for reshaping the tubing by manual and/or mechanized means In certain embodiments, the axially forced contact may be manually applied, for example, by rotating a knob, e.g. knob 35 shown in FIG. 2, pressing a lever, turning a crank, or any other mechanical interface in conjunction with threaded shafts, gears, levers, inclined planes, or any other mechanism for converting an operator's force into axially forced contact. Alternatively or additionally, the axially forced contact may be hydraulically or pneumatically applied.

In any event, as discussed above, the polymeric tube may be further enhanced by crosslinking. Additionally, as discussed above, the crosslinked polymeric tube may be polyethylene. Crosslinked polyethylene is typically known as "PEX." Crosslinking the tube imparts a "memory" of the original shape and dimensions of the tube, and as such, upon deformation of the crosslinked tube, the deformed tube will tend to resort back to the original dimension upon the application of a transforming force in a manner described below. This shape-memory feature may be employed by the present method in assisting formation of a connection between the crosslinked tube and fittings or other connections such as shown by example in FIG. 1 and FIG. 1a. This is particularly useful when the polymeric walls are crosslinked polyethylene, or PEX.

In one embodiment of this invention, the tubing 10 is made from high density polyethylene that is crosslinked (PEX). PEX contains crosslinked bonds in the polymer structure changing the thermoplastic into a thermoset. Crosslinking may be accomplished during or after the molding of the part. The required degree of crosslinking for crosslinked polyethylene tubing, according to ASTM Standard F 876-93 is between 65-89%. There are three classifications of PEX, referred to as PEX-A, PEX-B, and PEX-C. PEX-A is made by the peroxide (Engel) method. In the PEX-A method, peroxide blended with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during molding and during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even internal stimulus by the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. Alternatively, as typically occurs in tubing, programming occurs during storage and/or shipping when weight of the tubing bundle itself or of other objects compresses the tubing into a deformed temporary shape. The permanent crosslinked shape is now stored while the sample shows the temporary shape. The crosslinked material returns from the deformed state (e.g. temporary shape) to the original crosslinked shape (e.g. permanent shape) by applying an external or internal stimulus to the crosslinked material. Heating the shape memory polymer above a transition temperature $T_{trans}$ induces the shape memory effect providing internal forces urging the crosslinked polymer toward its permanent or crosslinked shape. Alternatively or in addition to the application of an external stimulus, for certain embodiments the application of an internal stimulus (e.g., the passage of time) achieves a similar, if not identical result.

A chemically crosslinked network may be formed by low doses of irradiation. Polyethylene chains are oriented upon the application of mechanical stress above the melting temperature of polyethylene crystallites, which can be in the range between 60° C. and 134° C. Materials that are most often used for the production of shape memory linear polymers by ionizing radiation include high density polyethylene, low density polyethylene and copolymers of polyethylene and poly(vinyl acetate). After shaping, for example, by extrusion, injection molding, compression molding, or any other molding or forming process, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrochlorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made from stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and poly(tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

The tubing may be made from a shape memory polymer such as crosslinked polyethylene, the polymer tube having been crosslinked setting a permanent dimension of the tube and shape memory characteristics. For example, the tubing 10 as shown in FIG. 1 and FIG. 1a may be crosslinked having a desired cross-section setting an interior permanent dimension $D_I$ and an outside permanent dimension $D_O$. Applying the present reshaping tool to the crosslinked tube end and reshaping the end of the tube in conformity with the shape of the reshaping tool causes the crosslinked tube end to take a temporary shape at least partially corresponding to the shape of the reshaping tool. While the tube end is in its temporary shape, the tube and mating part or fitting may be assembled. Following assembly of the tube and mating part, an external stimulus (e.g. heat) or internal stimulus (e.g. time) may be applied to the tube end engaging the tube end to an interior surface or an outside surface of the mating part by shape memory. By applying an internal or external stimulus, the crosslinked tube reverts from its temporary shape toward its permanent shape to the extent the tube is able to revert back to the permanent shape engaging the mating part.

In one example, a tube may be crosslinked setting a permanent dimension of the tube and shape memory characteristics, then wound on a spool or other shipping configuration in which the tube takes on a deformed temporary shape due to the weight or force of material pressing on it, such as due to weight of the tube in the spool pressing down on tubes beneath due to gravity. In this example, the tube may be reshaped using the reshaping tool from its deformed temporary shape to a second temporary shape at least partially corresponding to the shape of the reshaping tool. Then, while the tube end is in its second temporary shape, a mating part or fitting may be assembled with the tube. Following assembly of the tube and mating part, an external stimulus (e.g. heat) or internal stimulus (e.g. time) may be applied to the tube end engaging the tube end to the mating part by shape memory. Alternatively, a deformed tube may be reshaped using the reshaping tool to its original shape.

Referring now to FIG. 1, the fitting 17 includes a shaft 14 insertable into the tube end 13 for connecting the fitting and the tube in a fluid tight manner. The fitting 17 in FIG. 1 is positioned for inserting at least a portion of the fitting 17 into the inside of the tube end 13, the tube end 13 shown in FIG. 1 in an unexpanded shape. In one example of the present invention, a fitting 17 insertable into the interior of the tube end 13 such as shown in FIG. 1 may be received in the tube end 13 after reshaping the end of the tube using the first reshaping tool 42 making it suitable for connecting with an outside dimension $F_{OD}$ of the shaft 14 of the fitting. As discussed above, in certain applications, the tube end 13 may be deformed, and the reshaping tool constructed to reshape the generally non-uniform deformed cross-sectional shape of the tubing 10 to its original shape. In other applications, the tube end 13 may be reshaped to a desired cross-sectional shape easing installation of the fitting. For example, the tube end 13 of FIG. 1 may be enlarged to a interior dimension equal to or larger than the outside dimension $F_{OD}$ of the shaft 14 such that the force required to insert the fitting into the tube end is reduced, such as by using the first reshaping tool 42 with the tapered head 47 as discussed above.

In one example, the reshaped end of the tube 10 has a reshaped interior dimension larger than the interior permanent dimension $D_I$, and the shaft 14 of the connector 17 inserted into the tube end 13. The outside dimension $F_{OD}$ of the bore corresponds to the reshaped interior dimension of the tube and is equal to or larger than the interior permanent dimension $D_I$ of the tube such that applying an external or internal stimulus to the tube end allows the tube to contract about the outside dimension $F_{OD}$ of the shaft 14. The shaft 14 of the connector 17 may be any length, shape, or size as desired for engaging the tube as desired for the application.

In an alternative example, the fitting 17 may be a fitting such that the exterior of the tube is positioned in a bore 15 of the fitting such as shown in FIG. 1a and discussed above. The tube end 13 may be inserted into the fitting after reshaping the end of the tube using the second reshaping tool 43 making it suitable for connecting with an interior dimension $F_{ID}$ of the bore 15 of the fitting. As discussed above, in certain applications, the tube end 13 may be deformed, and the reshaping tool constructed to reshape the generally non-uniform deformed cross-sectional shape of the tubing 10 to its original shape. In other applications, the tube end 13 may be reshaped to a desired cross-sectional shape easing installation of the fitting. For example, the tube end 13 of FIG. 1a may be reduced to an outside dimension equal to or smaller than the interior dimension $F_{OD}$ of the bore 15 such that the force required to insert the fitting into the tube end is reduced, such as by using the second reshaping tool 43 incorporating the tapered aperture 48 as discussed above.

In another example, referring to FIG. 1a, the reshaped end of the tube 10 has a reshaped outside dimension smaller than the outside permanent dimension $D_O$, and the tube end 13 is inserted into the bore 15 of the connector 17. The interior dimension $F_{ID}$ of the bore corresponds to the reshaped outside dimension of the tube and is equal to or smaller than the outside permanent dimension $D_O$ of the tube such that applying an external or internal stimulus to the tube end allows the tube to expand about the interior dimension $F_{ID}$ of the bore 15. The bore 15 of the connector 17 may be any length, shape, or size as desired for engaging the tube as desired for the application.

In many applications, the tubing cross-section is circular as shown in FIGS. 1 and 1a, and the reshaping tool provides a corresponding shape. However, reshaping tools for non-circular profiles are envisioned to be within the scope of this invention.

The best mode for carrying out the invention has been described for the purposes of illustrating the best mode known to the applicant at the time. The examples are illustrative only and not meant to limit the invention, as measured by the scope and spirit of the claims. The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A method of reshaping an end of a tube including steps of:
   providing a deformed tube having a deformed cross-sectional shape,
   clamping the deformed tube in a tubing clamping means with an end of the tube axially aligned with a reshaping tool,
   axially engaging the reshaping tool against the tube end, and
   reshaping the end of the tube in conformity with a shape of the reshaping tool by axially forced contact of the reshaping tool against the tube end, without adding heat to the reshaping tool.

2. The method of claim 1, further comprising applying a fitting to the end of the tube.

3. The method of claim 1, the step of reshaping comprising
   forming an interior surface of the tube adjacent the tube end in conformity with the shape of the reshaping tool.

4. The method of claim 1, the step of reshaping comprising
   forming an outside surface of the tube adjacent the tube end in conformity with the shape of the reshaping tool.

5. The method of claim 1, where the tube is a polymeric tube enhanced by crosslinking.

6. The method of claim 5, where the polymeric tube is polyethylene.

7. The method of claim 1, where the reshaping tool comprises a longitudinally axially movable member having an aperture disposed therein; and prior to the step of axially engaging the reshaping tool, the method of reshaping an end of a tube further comprising
   inserting at least one insertable member into the aperture of the reshaping tool for modifying a cross-sectional profile of the tubing, the insertable member selected from a group consisting of an interior dimension reshaping member and an outside dimension reshaping member.

8. The method of claim 7, where
the insertable member is an interior dimension reshaping member having an initial outside dimension at a tubing insertion end of the insertable member that increases in size to a larger outside dimension interior of the tube end.

9. The method of claim 7, where
the insertable member is an outside dimension reshaping member having an initial interior dimension at a tubing insertion end of the insertable member that decreases in size to a smaller interior dimension interior of the tube end.

10. The method of claim 1, where the axially forced contact is manually applied.

11. The method of claim 1, where the axially forced contact is hydraulically or pneumatically applied.

12. A method of reshaping an end of a tube including steps of:
clamping a polymer tube in an axially fixed clamping means with an end of the tube axially aligned with a reshaping tool, the polymer tube having been cross-linked setting a permanent dimension of the tube and shape memory characteristics,
axially engaging the reshaping tool against the tube end, and
reshaping the end of the tube in conformity with a shape of the reshaping tool by axially forced contact of the reshaping tool against the tube end without adding heat to the reshaping tool, the reshaped end of the tube having at least one reshaped dimension larger than or less than the permanent dimension.

13. The method of claim 12, the step of reshaping comprising
forming an interior surface of the tube adjacent the tube end in conformity with the shape of the reshaping tool.

14. The method of claim 12, the step of reshaping comprising
forming an outside surface of the tube adjacent the tube end in conformity with the shape of the reshaping tool.

15. The method of claim 12, further comprising
assembling the end of the tube with a mating part,
applying an external or internal stimulus to the tube end engaging the tube end to an interior surface or an outside surface of the mating part by shape memory.

16. The method of claim 15, where
the external stimulus is a temperature in excess of a polymer transition temperature.

17. The method of claim 15, where
the internal stimulus is the passage of time.

18. The method of claim 15, further comprising,
where the step of reshaping the tube end includes the reshaped end of the tube having a reshaped interior dimension larger than an interior permanent dimension,
inserting a shaft of a connector into the end of the tube, an outside dimension of the shaft corresponding to the reshaped interior dimension of the tube and equal to or larger than the interior permanent dimension of the tube, and
the step of applying an external or internal stimulus to the tube end contracting the tube about the shaft.

19. The method of claim 15, further comprising,
where the step of reshaping the tube end includes the reshaped end of the tube having a reshaped outside dimension smaller than an outside permanent dimension,
inserting the tube end into a bore of a connector, an interior dimension of the bore corresponding to the reshaped outside dimension of the tube and equal to or smaller than the outside permanent dimension of the tube; and
the step of applying an external or internal stimulus to the tube end expanding the tube in the bore.

20. The method of claim 12, where the reshaping tool comprises a longitudinally axially movable member having an aperture disposed therein; and prior to the step of axially engaging the reshaping tool, the method of reshaping an end of a tube further comprising
inserting at least one insertable member into the aperture of the reshaping tool for modifying a cross-sectional profile of the tubing, the insertable member selected from a group consisting of an interior dimension reshaping member and an outside dimension reshaping member.

* * * * *